United States Patent
Ostrobrod

(10) Patent No.: US 9,163,651 B2
(45) Date of Patent: Oct. 20, 2015

(54) CONCRETE ANCHOR

(71) Applicant: Meyer Ostrobrod, Philadelphia, PA (US)

(72) Inventor: Meyer Ostrobrod, Philadelphia, PA (US)

( * ) Notice: Subject to any disclaimer, the term of this patent is extended or adjusted under 35 U.S.C. 154(b) by 80 days.

(21) Appl. No.: 13/804,997

(22) Filed: Mar. 14, 2013

(65) Prior Publication Data

US 2014/0263903 A1    Sep. 18, 2014

(51) Int. Cl.

| | |
|---|---|
| *E04G 21/32* | (2006.01) |
| *F16B 13/08* | (2006.01) |
| *A62B 35/00* | (2006.01) |
| *F16B 13/04* | (2006.01) |
| *F16B 7/02* | (2006.01) |
| *F16B 7/14* | (2006.01) |
| *F16B 21/16* | (2006.01) |
| *F16B 13/10* | (2006.01) |

(52) U.S. Cl.
CPC ......... *F16B 13/0891* (2013.01); *A62B 35/0068* (2013.01); *E04G 21/3276* (2013.01); *F16B 7/025* (2013.01); *F16B 7/1409* (2013.01); *F16B 7/1463* (2013.01); *F16B 13/045* (2013.01); *F16B 13/08* (2013.01); *F16B 13/0816* (2013.01); *F16B 13/0825* (2013.01); *F16B 13/0833* (2013.01); *F16B 13/0858* (2013.01); *F16B 13/0883* (2013.01); *F16B 21/165* (2013.01); *F16B 2013/10* (2013.01)

(58) Field of Classification Search
CPC ...... F16B 7/025; F16B 7/1409; F16B 7/1463; F16B 21/165; F16B 13/045; F16B 13/08; F16B 13/0816; F16B 13/0825; F16B 13/0833; F16B 13/0858; F16B 13/0883; F16B 13/0891; F16B 2013/10; E04G 21/3276; A62B 35/0068

USPC .......................... 248/509; 403/322.2
See application file for complete search history.

(56) References Cited

U.S. PATENT DOCUMENTS

| | | | |
|---|---|---|---|
| 2,298,552 A | 10/1942 | Du Vall | |
| 2,968,205 A * | 1/1961 | Springate | 411/348 |
| 2,983,978 A * | 5/1961 | Wilgus | 411/555 |
| 3,085,462 A * | 4/1963 | Myers | 411/348 |
| 3,117,484 A * | 1/1964 | Myers | 411/348 |
| 3,215,023 A * | 11/1965 | Becker | 411/348 |
| 3,233,496 A * | 2/1966 | Frick et al. | 411/348 |
| 3,469,871 A * | 9/1969 | Betts | 403/325 |
| 3,478,641 A | 11/1969 | Dohmeier | |
| 4,026,184 A * | 5/1977 | Sozzi | 411/19 |
| 4,185,438 A * | 1/1980 | Fischer | 52/704 |
| 4,720,224 A * | 1/1988 | Peterken | 411/36 |
| 4,834,327 A | 5/1989 | Byrne | |
| 5,484,132 A | 1/1996 | George et al. | |

(Continued)

*Primary Examiner* — Terrell McKinnon
*Assistant Examiner* — Eret McNichols
(74) *Attorney, Agent, or Firm* — Norman E. Lehrer

(57) ABSTRACT

A concrete anchor for securing the lanyard of a workman's harness to a fixed position on a concrete surface includes a cylindrical housing having an outer wall with openings therein and a rod that extends above the housing to which a harness can be attached. Hard metal balls within the housing are associated with each opening and are dimensioned so that a portion of each ball can pass through each opening but the entire ball can not pass therethrough. A pair of cones within the housing move the balls radially outwardly as the cones are moved upwardly by the rod which is spring biased upwardly. A visual marker carried by the rod normally lies within the housing but is visible from outside of the housing if said rod has moved up by a predetermined amount. This gives an indication that the anchor has been used.

8 Claims, 2 Drawing Sheets

(56) References Cited

U.S. PATENT DOCUMENTS

| | | | |
|---|---|---|---|
| 5,967,477 A * | 10/1999 | Walmsley | 248/230.2 |
| 6,386,789 B1 | 5/2002 | Chausse et al. | |
| 6,729,821 B2 | 5/2004 | Guthrie et al. | |
| 7,011,281 B2 | 3/2006 | Guthrie et al. | |
| 7,125,058 B2 * | 10/2006 | Hawthorne | 294/82.28 |
| 7,225,760 B2 * | 6/2007 | Krieger | 119/786 |
| 7,258,316 B2 | 8/2007 | Reeves | |
| 7,357,363 B2 | 4/2008 | Guthrie et al. | |
| 7,445,050 B2 * | 11/2008 | Kuttel et al. | 166/380 |
| 7,574,768 B2 * | 8/2009 | Morris et al. | 15/145 |
| 7,736,109 B2 * | 6/2010 | Schmier, II | 411/348 |
| 7,744,140 B2 * | 6/2010 | Rowley | 294/94 |
| 7,854,053 B2 | 12/2010 | Schmier, II | |
| 7,891,903 B2 | 2/2011 | Klingenberg et al. | |
| 8,162,581 B2 * | 4/2012 | Soltis et al. | 411/348 |
| 8,220,209 B2 * | 7/2012 | Roy et al. | 52/156 |
| 8,251,606 B2 * | 8/2012 | Blanchard | 403/322.2 |
| 8,529,151 B2 * | 9/2013 | Blanchard | 403/322.2 |
| 8,561,362 B2 * | 10/2013 | Dempsey | 52/157 |
| 2002/0021949 A1 * | 2/2002 | Chate | 411/348 |
| 2002/0071738 A1 * | 6/2002 | Choate | 411/348 |
| 2004/0213633 A1 * | 10/2004 | Guthrie et al. | 403/367 |
| 2006/0011147 A1 * | 1/2006 | Krieger | 119/788 |
| 2006/0269360 A1 * | 11/2006 | Rowley | 405/158 |
| 2007/0003391 A1 * | 1/2007 | Stapulionis et al. | 411/348 |
| 2009/0056267 A1 * | 3/2009 | Reeves | 52/699 |
| 2012/0288325 A1 * | 11/2012 | Blanchard | 403/322.2 |
| 2013/0298493 A1 * | 11/2013 | Guthrie et al. | 52/704 |
| 2014/0030011 A1 * | 1/2014 | Baus | 403/321 |
| 2014/0217255 A1 * | 8/2014 | Rinklake | 248/304 |

* cited by examiner

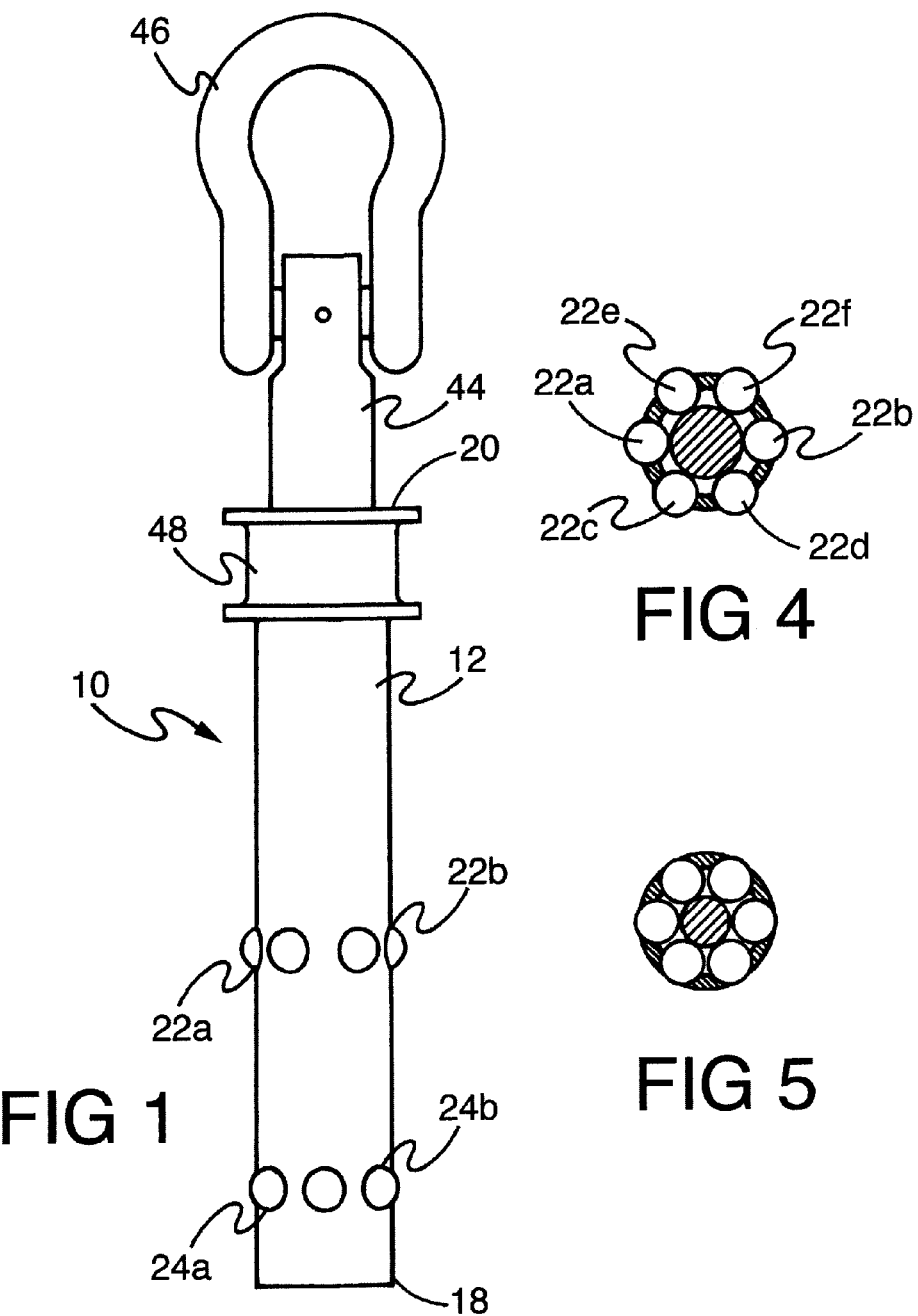

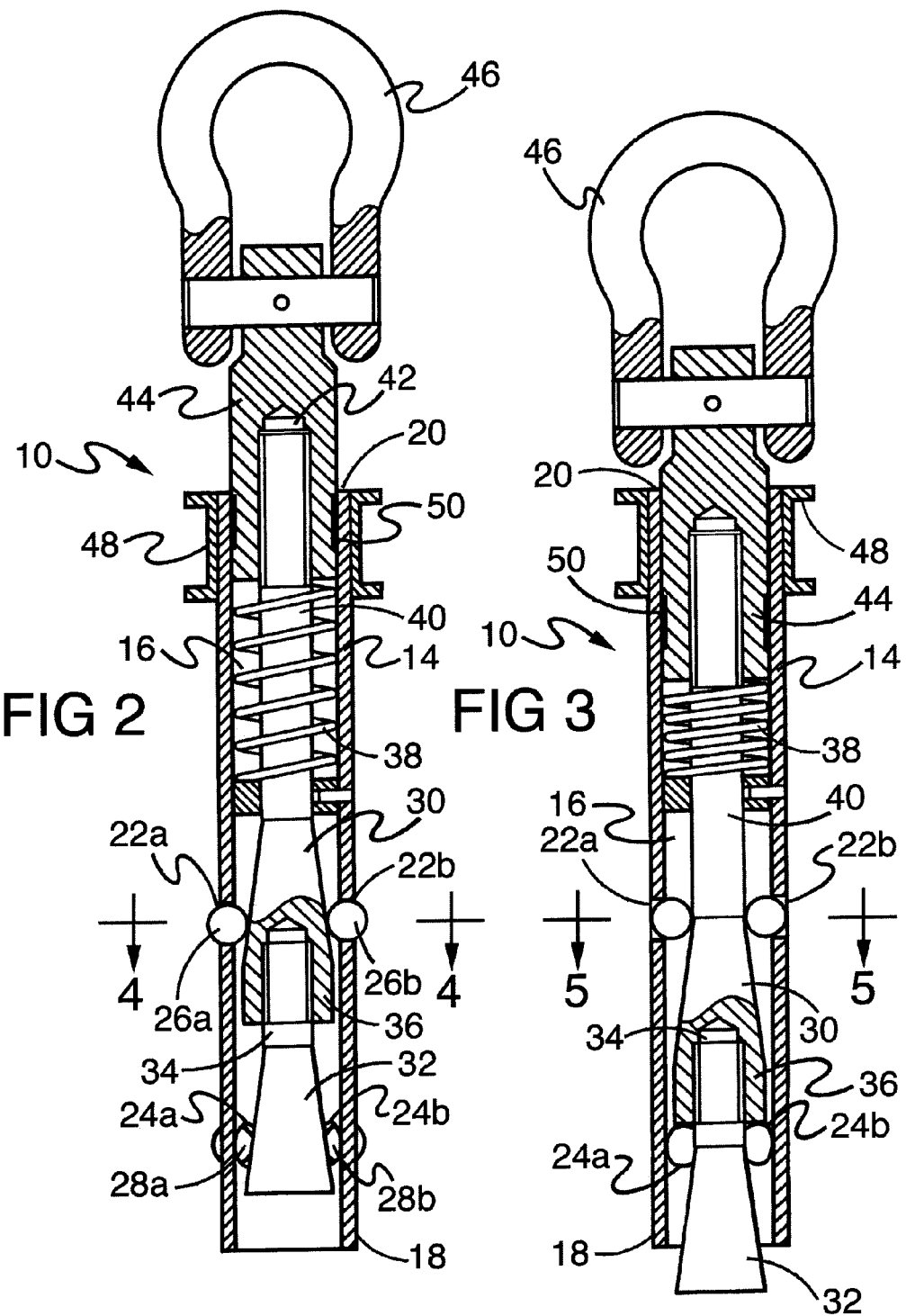

CONCRETE ANCHOR

BACKGROUND OF THE INVENTION

The present invention is directed toward a concrete anchor and, more particularly, toward a concrete anchor that is adapted to be connected the lanyard of a harness of a construction worker to help prevent injury to the worker in the event of a fall.

During the construction or repair of buildings, bridges, road overpasses and other structures, workmen of various specialties frequently have to work at high elevations. To prevent injuries from falls, these workmen are provided with a harness and lanyard. Frequently, the lanyard is connected to a fall safety device such as described in U.S. Pat. No. 4,511,123 which issued to the present Applicant and which controls the decent and stops a worker from falling. In any event, the lanyard or the fall safety device must be secured to a fixed part of the structure. This can be directly to part of the iron work or to a horizontal life line such as shown in U.S. Pat. No. 6,640,727 which also issued to the present Applicant.

There are, however, times when iron work or the like is not available and the lanyard or lifeline must be secured directly to a concrete slab. The concrete may be a floor or wall or even a concrete ceiling. To accomplish this, concrete anchors have been proposed and marketed in the past. To Applicant's knowledge, however, none has been satisfactory.

U.S. Pat. Nos. 6,729,821; 7,011,281 and 7,357,363 to Guthrie et al, for example, describe an expansion bolt that can be used in the construction industry and which is intended to be inserted into a bore formed in a concrete slab. The anchor shown therein includes a pair of semi-cylindrical outer chucks that are forced apart by an inner cone when a pulling force is applied to the cone. It has been found, however, that the patented anchor is not always reliable and can slip out of the bore if sufficient force is applied.

A similar arrangement is taught in U.S. Pat. No. 7,258,316 to Reeves. This patent also shows a pair of semi-cylindrical outer chucks forced apart by an inner conical or tapered member. As with the Guthrie et al. device, the Reeves' anchor can slip if sufficient pulling force is applied.

Steel balls that are forced outwardly by an internal cone or cam when the cam is axially moved have also been known. However, these function primarily as quick release locking pins rather than anchors. See, for example, U.S. Pat. No. 6,386,789 to Chausse et al. and U.S. Pat. No. 7,736,109 to Schiemer, II. To Applicant's knowledge, devices such as these have never been designed to function as concrete anchors.

Because the prior art has not proven to be satisfactory, a need exists for a concrete anchor that can be quickly installed but which will safely and effectively hold in place so as to protect a worker from injury in the event of a fall.

SUMMARY OF THE INVENTION

The present invention is designed to overcome the deficiencies of the prior art discussed above. Accordingly, it is an object of the invention to provide a concrete anchor that is easy to install.

It is a further object of the present invention to provide a concrete anchor that will securely hold a worker and prevent injury in the event of a fall.

It is a still further object of the present invention to provide a concrete anchor that includes an indicator thereon which will advise the user if the anchor had previously been used to actually prevent a workman from falling.

In accordance with the illustrative embodiments demonstrating features and advantages of the present invention, there is provided a concrete anchor for securing the lanyard of a workman's harness to a fixed position on a concrete surface which includes a cylindrical housing having an outer wall with openings therein and a rod that extends above the housing to which a harness can be attached. Hard metal balls within the housing are associated with each opening and are dimensioned so that a portion of each ball can pass through each opening but the entire ball can not pass therethrough. A pair of cones within the housing move the balls radially outwardly as the cones are moved upwardly by the rod which is spring biased upwardly. A visual marker carried by the rod normally lies within the housing but is visible from outside of the housing if said rod has moved up by a predetermined amount. This gives an indication that the anchor has been used to prevent a fall so that it can be refurbished or replaced.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawing one form which is presently preferred; it being understood that the invention is not intended to be limited to the precise arrangements and instrumentalities shown.

FIG. 1 is a front elevational view of a concrete anchor of the present invention;

FIG. 2 is a vertical cross-section of the anchor shown in FIG. 1 in a first position;

FIG. 3 is a vertical cross-sectional view similar to FIG. 2 but showing the anchor in a second position;

FIG. 4 is a cross-sectional view taken through the lines 4-4 of FIG. 2, and

FIG. 5 is a cross-sectional view taken through the lines 5-5 of FIG. 3.

DETAILED DESCRIPTION OF THE PREFERRED EMBODIMENT

Referring now to the drawings in detail wherein like reference numerals have been used throughout the various figures to designate like elements, there is shown in FIG. 1 a concrete anchor constructed in accordance with the principles of the present invention and designated generally as 10. The anchor 10 is comprised of a substantially cylindrically shaped housing 12 having a substantially cylindrically shaped outer wall 14 and a substantially hollow interior 16. The housing 12 has a length defined by a lower end 18 and an upper end 20. As should be readily apparent to those skilled in the art, the outer dimensions of the housing 12 are such as to fit within a similarly shaped bore in the surface of a concrete slab.

The wall 14 has a plurality of openings therein such as shown at 22a and 22b and at 24a and 24b. In the preferred embodiment of the invention, there are six openings 22a-22f and six openings 24a-24f. The first set of six openings 22a-22f are arranged around the housing 12 so as to be substantially equally angularly spaced around the same but all at the same axial distance from the lower end 18 of the housing. Similarly, the second set of six openings 24a-24f are arranged around the housing but axially offset from the first set of openings. Again, the second set of openings are all located at the same axial distance from the lower end 18 of the housing but are closer to the end 18 than the first set of openings.

A first set of balls 26a-26f are arranged within the interior 16 of the housing 12 and are positioned within the openings 22a-22f and a second set of balls 28a-28f are arranged within the housing 12 and are positioned with the second set of openings 24a-24f. The balls are made of a hard metal, preferably stainless steel. The diameter of each of the balls is slightly greater than the size of the openings. As a result, a substantial portion of each ball can pass through its respective opening but the entire ball can not pass therethrough.

First and second cones 30 and 32 are located within the housing 12. The first cone 30 is in contact with the first set of balls 26a-26f so as to be capable of camming or moving them radially outwardly as the cone 30 moves vertically upwardly. The second cone 30 is in contact with the second set of balls 28a-28f so as to be capable of camming or moving them radially outwardly as the cone 32 moves vertically upwardly. The cones 30 and 32 are preferably connected together by having the upper end 34 of the cone 32 threaded into the lower end 36 of the cone 30 so that the two cones always move in unison.

As shown best in FIGS. 2 and 3, the cones are moveable between a lower position (FIG. 3) whereby the balls lie substantially within the housing and a plurality of vertical positions wherein said balls are forced radially outwardly so as to extend into the openings and out of the housing (FIG. 2). A spring 38 located within the housing 12 biases the cones 30 and 32 upwardly so as to bias the balls outwardly.

An elongated rod 40 is connected to the top of the first cone 30 and extends upwardly through and out of the upper end 20 of the cylinder 12. Preferably, the upper end 42 of the rod 40 is threaded into a piston 44 that has an outer dimension that is just less than the inner dimension of the cylinder 12. The piston 44 slides easily in the cylinder and acts essentially as an extension of the rod 40.

Attached to the upper end of the piston-rod combination, is a loop 46 to which a lanyard from a safety harness can be attached. The upper end 20 of the housing 12 includes a finger grip 48, the purpose of which will become apparent. Furthermore, the outer surface of the piston 44 is provided with a visual marker such as shown at 50. The visual marker may be a contrasting color applied to the surface or markings or the like etched into or otherwise formed thereon. The visual marker 50 is normally not visible as it is normally located within the interior of the housing 12 in either of the two normal positions shown in FIGS. 1 and 2 but may become visible as explained below.

In use, the concrete anchor 10 is inserted into a bore drilled in a concrete slab. This is done by holding the finger grip 48 while pushing down on the top of the piston 44 against the force of the spring 38. This removes the outward bias on the balls 26a-26f and 28a-28f allowing them to move inwardly. The anchor 10 can then easily be inserted into the bore. Once inserted, the piston and finger grip are released and the balls are forced outwardly by the cones and spring to retain the anchor in the bore. Once the anchor is in place in the concrete slab, a workman's lanyard is attached to the loop 46.

In the event of a fall, the lanyard from the worker's safety harness will pull with significant force upwardly on the piston 44 and rod 40. This upward force will move the cones 30 and 32 upwardly to force the balls outwardly where they will engage the walls of the concrete ball and prevent the anchor from being dislodged from the bore. The upward movement of the rod and piston, however, will cause them to be higher than their normal position shown in FIG. 2. This will expose the visual marker 50 which obviously signals anyone seeing the anchor that a fall had occurred and that the anchor should be repaired or refurbished before it is used again.

To remove the anchor 10 from the concrete bore, all that is necessary is to again grasp the finger grip 48 while pushing down on the piston 44. As pointed out above, this removes the outward bias on the balls, allowing them to move away from the walls of the bore and releasing the anchor. If the visual indicator is visible when the anchor is removed, it must be repaired or refurbished or replaced. If, however, the visual indicator is not visible, the anchor can be use again.

The present invention may be embodied in other specific forms without departing from the spirit or essential attributes thereof and accordingly, reference should be made to the appended claims rather than to the foregoing specification as indicating the scope of the invention.

I claim:

1. A concrete anchor for securing the lanyard of a workman's harness to a fixed position on a concrete surface wherein said concrete surface has a cylindrically shaped bore formed therein, said anchor comprising:
    a substantially cylindrically shaped housing having a substantially cylindrically shaped outer wall and a substantially hollow interior, said housing having a length defined by a lower end and an upper end, the outer dimensions of said housing being such as to fit within said bore in said concrete surface;
    a first set of openings in said outer wall, said first set of openings being angularly spaced from each other but being located the same axial distance from said lower end of said housing;
    a first set of hard metal balls within said hollow interior of said housing, the number of balls being equal to the number of said first set of openings with one ball associated with each opening, the diameter of each ball being slightly greater than the size of said openings whereby a portion of each ball can pass through each opening but the entire ball can not pass therethrough;
    a second set of openings formed in said outer wall of said housing, said second set of openings being in axial alignment with each other but being angularly spaced from each other, said second set of openings being axially spaced from said first set of openings and a second set of hard metal balls associated with said second set of openings with one ball being positioned within each of said second openings;
    a first cone within said housing, said first cone being in contact with said first set of balls so as to be capable of moving them radially outwardly, said first cone being vertically moveable between a lower position whereby said first balls lie substantially within said housing and a plurality of vertical positions wherein said balls are forced radially outwardly so as to extend into said first set of openings;
    a second cone within said housing, said second cone being connected to said rod and being arranged to move said second set of balls outwardly as said rod is moved upwardly, said second cone being axially spaced from said first cone and being connected thereto by a screw thread;
    biasing means within said housing biasing said cone upwardly to bias said balls outwardly;
    a rod connected to the top of said first cone and extending upwardly through and out of said upper end of said cylinder, and
    a loop at the upper end of said rod to which said lanyard can be attached, whereby if a sufficient upward force is applied to said loop, said first cone is moved upwardly to force said first set of balls into said first openings.

2. The concrete anchor as claimed in claim 1 including a visual marker carried by said rod, said visual marker normally lying within said housing but being visible from outside of said housing if said rod has moved up by a predetermined amount.

3. The concrete anchor as claimed in claim 1 wherein said rod is connected to one of said first and second cones by a screw thread.

4. The concrete anchor as claimed in claim 1 wherein said openings in said second set of openings are radially offset from said openings in said first set of openings.

5. A concrete anchor for securing the lanyard of a workman's harness to a fixed position on a concrete surface wherein said concrete surface has a cylindrically shaped bore formed therein, said anchor comprising:
- a substantially cylindrically shaped housing having a substantially cylindrically shaped outer wall and a substantially hollow interior, said housing having a length defined by a lower end and an upper end, the outer dimensions of said housing being such as to fit within said bore in said concrete surface;
- a first set of openings in said outer wall, said first set of openings being angularly spaced from each other but being located the same axial distance from said lower end of said housing;
- a first set of hard metal balls within said hollow interior of said housing, the number of balls being equal to the number of said first set of openings with one ball associated with each opening, the diameter of each ball being slightly greater than the size of said openings whereby a portion of each ball can pass through each opening but the entire ball cannot pass therethrough;
- a second set of openings formed in said outer wall of said housing, said second set of openings being in axial alignment with each other but being angularly spaced from each other, said second set of openings being axially spaced from said first set of openings and a second set of hard metal balls associated with said second set of openings with one ball being positioned within each of said second set of openings;
- a first cone within said housing, said first cone having a conical surface, the conical surface of said first cone being in constant contact with said first set of balls so as to be capable of moving them radially outwardly, said first cone being vertically moveable between a lower position whereby said first balls lie substantially within said housing and a plurality of vertical positions wherein said balls are forced radially outwardly so as to extend into said first set of openings, said conical surface of said first cone being in constant contact with said first set of balls throughout the movement thereof;
- a second cone within said housing, said second cone being connected to said rod and being arranged to move said second set of balls outwardly as said rod is moved upwardly, said second cone being axially spaced from said first cone and being connected thereto by a screw thread;
- biasing means within said housing continuously biasing said cone upwardly to continuously bias said balls outwardly;
- a rod connected to the top of said first cone and extending upwardly through and out of said upper end of said cylinder, and
- a loop at the upper end of said rod to which said lanyard can be attached, whereby if a sufficient upward force is applied to said loop, said first cone is moved upwardly to force said first set of balls into said first openings and against the walls of said bore in said concrete while said first set of balls remain in contact with said conical surfaces of said first cone.

6. The concrete anchor as claimed in claim 5 including a visual marker carried by said rod, said visual marker normally lying within said housing adjacent said upper end of said housing but being visible from outside of said housing if said rod has moved up by a predetermined amount.

7. The concrete anchor as claimed in claim 5 wherein said rod is connected to one of said first and second cones by a screw thread.

8. The concrete anchor as claimed in claim 5 wherein said openings in said second set of openings are radially offset from said openings in said first set of openings.

* * * * *